May 30, 1944.  E. H. IRASEK  2,349,824
ROLLER BEARING SEPARATOR
Filed Nov. 19, 1943
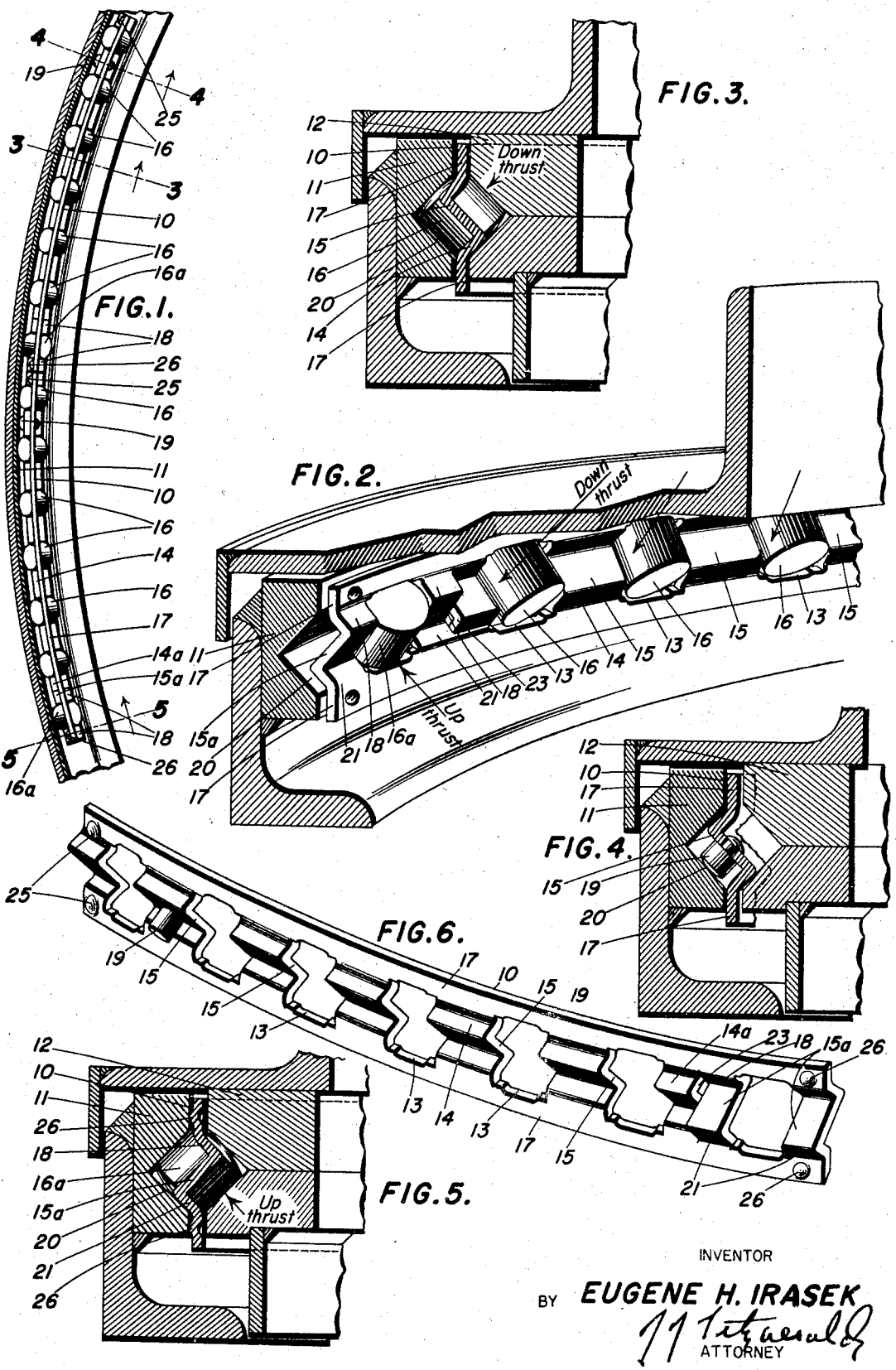
INVENTOR
BY EUGENE H. IRASEK
ATTORNEY Patented May 30, 1944

2,349,824

UNITED STATES PATENT OFFICE 2,349,824

ROLLER BEARING SEPARATOR

Eugene H. Irasek, Bethesda, Md.

Application November 19, 1943, Serial No. 510,908

6 Claims. (Cl. 308—235)

(Granted under the act of March 3, 1883, as amended April 30, 1928; 370 O. G. 757)

This invention relates to roller separators and has particular relation to roller separators for use in roller bearing units for supporting radial or thrust loads, or a combination of radial and thrust loads in either or both radial and thrust directions.

Present cages or separators permit a roller bearing unit to take radial loads in both radial directions and thrust loads in one thrust direction. These separators do not provide sufficient support for the rollers along their axes, and they impart considerable frictional resistance to the bearing unit. Separators of the one-piece type as proposed heretofore, are difficult to manufacture, and due to their one-piece construction their use is restricted to special bearing units designed to permit assembly and disassembly of the one-piece separator. Present cylindrical separators constructed of two or more pieces have the objection that they are riveted or welded into a single cylindrical piece which impairs their concentricity.

It is an object of the present invention to provide a separator for use in a roller bearing unit of the single raceway type for supporting radial loads in both radial directions and thrust loads in both thrust directions.

Another object of the invention is to provide a roller separator which gives full support to the rollers along the entire axes of the rollers.

A further object of the invention is to provide a roller separator which is accurately and securely supported in a bearing unit in order to minimize the friction loss contributed by the separator.

A still further object of the invention is to provide a roller separator which is capable of being constructed and used in a plurality of separate individual sections.

Still another object of the invention is to provide a roller separator composed of separate individual sections which are readily assembled and disassembled in a single raceway bearing unit.

It is among the objects of the invention to provide a roller separator of economical manufacture which is readily constructed by stamping and forming, by extrusion, or by casting of a suitable metal or plastic.

In a preferred form, the complete roller separator comprises a number of arcuate separator sections adapted to form a circle concentric with the raceway in which the separator is mounted. The separator sections are formed in an approximate Z-shape in transverse section and are provided at intervals with rectangular apertures for the rollers. The outer edges of the Z-shaped sections are formed to position the separator perpendicularly relative to the axis of the bearing unit. The spacing bars between the apertures forming the slanted portion of the Z-shaped sections provide support along the entire length of the rollers and parallel to the axes of the rollers. Certain of the spacing bars may be reversed in position relative to the other spacing bars so that the separator is adapted to receive one set of rollers for supporting thrusts from opposite directions and another set for supporting thrusts from opposite directions substantially perpendicular to the first directions.

For a better understanding of the invention, reference may be had to the accompanying drawing in which:

Fig. 1 is a horizontal sectional view of a track assembly, showing two of the separator sections in place;

Fig. 2 is a sectional perspective view of a portion of a track assembly showing part of a separator;

Figs. 3, 4 and 5 are cross-sectional views taken on the lines 3—3, 4—4, and 5—5, respectively, in Fig. 1, and Fig. 6 is a perspective view of one of the separators.

The roller separator, as shown, comprises a sheet metal section 10 which is longitudinally curved so as to be concentric with the raceway 11 of the bearing unit. Referring to Fig. 6, the section 10 is provided with rectangular apertures 13 which are separated by spacing bars 14. Each of the spacing bars 14 is formed in a generally Z-shaped fashion, the slanting segment 15 of the bar 14 being disposed in a plane parallel to the axis of the roller which it retains in position. Each aperture 13 is adapted to receive a roller 16 which is confined by the adjacent spacing bars 14 as shown in Fig. 2. The outer edges 17 of the separator section 10 are coplanar and are adapted to be positioned between the outer raceway 11 and the inner raceway 12. Certain of the Z-shaped spacing bars are reversed in position relative to the bars 14, as shown at 18 in order to provide means for retaining a roller 16a adapted to support a thrust from a direction substantially perpendicular to the thrust and on rollers 16. Referring to Fig. 2, the spacing bars 14 retain the roller 16 taking down thrust; whereas the spacing bars 18 retain the roller 16a, taking up thrust. It will be noted that the slanting portion 15 of each spacing bar is always positioned parallel to the axis of the roller which it retains. As shown in Fig. 3, the slanting portion 15 of the spacing bar is coplanar with the axis of the roller 16 taking the downward thrust. Correspondingly, in Fig. 5 the slanting portion 15a of the spacing bar 18 is coplanar with the axis of the roller 16a taking the upward thrust. The spacing bars 14 and 18 may be alternated in any desired order in the separator section and, as shown in Fig. 2, the spacing bars 14 confine the roller 16 taking the downward thrust, whereas the spacing bars 18 confine the roller 16a taking the upward thrust.

In one embodiment of the invention, one end of the separator section 10 is supported in the raceway by a button 19 which is riveted or otherwise fastened to the lower outer side of the slanted portion 15 of the spacing bar 14. Referring to Fig. 4, the bottom of the button 19 rests on the lower inner surface 20 of the outer raceway 11. Referring now to Fig. 5, the opposite end of the separator section 10 is supported by the lower portions 21 of the reversely positioned spacing bars 18 which confine the roller taking the upward thrust. The bottom portion 21 rests on the lower inner surface 20 of the outer raceway 11. It will be understood that other suitable means may be provided for supporting the separator section in the raceway. For example, if the upward and downward thrust loads are substantially equal, the spacing bars may be alternated in equal number and the separator section 10 will rest on the bottom edges 21 of the alternately positioned spacing bars 18, thereby eliminating the necessity for use of the button 19.

It will be understood that the reversely positioned spacing bars 18 may be alternated with respect to the bars 14 in any desired fashion, the sequence of alternation ordinarily depending upon the ratio of radial and thrust loads. If desired, one of the separator sections may have all of the spacing bars positioned in the same direction, and an adjacent separator section need only be placed upside down in the raceway to provide a separator section for rollers taking thrust in a different direction. In this connection, it will be understood that an individual separator section may be of any convenient length and contain any desired number of spacing bars positioned in the same or opposite position. In bearing units, it is ordinarily desirable that the rollers be equi-distantly spaced, and it is obvious that this is accomplished by having the spacing bars of uniform width and having the distance from the side edges of adjacent, oppositely positioned spacing bars of the same dimension as the uniform width. In one form of the invention, the spacing bars are alternated in opposite positions adjacent to each other by splitting one of the spacing bars, as shown at 23, and reversing one of the split halves 18 in a direction parallel to the axis of the roller 16a which it retains. Each roller is retained by spacing bars which are positioned parallel to the axis of the roller.

The bearing assembly is illustrated in the drawing in a form suitable for use in a horizontal position. However, the assembly may be used with the separator of the present invention in an angular position. If the separator is used in a vertical position, the button 19 is unnecessary, since the separator section 10 derives its support from the upper and lower edges 17 which are positioned in the narrow space between the outer raceway 11 and the inner raceway 12, no further support being necessary. In the event that it is necessary to restrict friction losses to a minimum, the punched knobs 25 and 26, or other suitable means, are provided on both sides of the outer edges 17 to support the separator section 10.

It will be understood that the present separator cage has application for use in any bearing assembly and is particularly adapted for use in single raceway roller bearing units supporting radial loads in both directions and thrust loads in both directions. A bearing assembly of this type, for which the present separator is particularly adapted, is disclosed in a copending application of P. R. Wheeler, Serial No. 517,050, filed Jan. 5, 1944. It will be further understood that the term "sheet strip member" as used in the appended claims includes any sheet strip member which is formed by extrusion, casting, rolling, stamping or other method of forming.

The invention herein described may be manufactured and used by or for the Government of the United States of America for governmental purposes without the payment of any royalties thereon or therefor.

I claim:

1. A roller separator comprising a sheet strip member having spaced apertures therein for receiving rollers, said member having integral spacing bars of substantially Z-shaped section defining the sides of said apertures, and a roller in each of said apertures, the slanting portion of each spacing bar being positioned parallel to the axis of the roller received in the adjacent aperture and retained by said spacing bar.

2. A roller separator comprising a sheet strip member having spaced apertures therein for receiving rollers, said member having integral spacing bars of substantially Z-shaped section defining the sides of said apertures, and a roller in each of said apertures, the slanting portion of each spacing bar being positioned parallel to the axis of the roller received in the adjacent aperture and retained by said spacing bar, at least one of said spacing bars being reversely positioned with respect to another.

3. A roller separator comprising an arc-shaped sheet strip member having spaced apertures therein for receiving rollers, said member having integral spacing bars of substantially Z-shaped section defining the sides of said apertures, and a roller in each of said apertures, the slanting portion of each spacing bar being positioned parallel to the axis of the roller received in the adjacent aperture and retained by said spacing bar, at least one of said spacing bars being split longitudinally into two Z-shaped sections, one of said sections being positioned reversely with respect to the other.

4. A roller separator comprising an arc-shaped sheet strip member having spaced apertures therein for receiving rollers, said member having integral spacing bars of substantially Z-shaped section defining the sides of said apertures, a roller in each of said apertures, the slanting portion of each spacing bar being positioned parallel to the axis of the roller received in the adjacent aperture and retained by said spacing bar, at least one of said spacing bars being split longitudinally into two Z-shaped sections, one of said sections being positioned reversely with respect to the other and defining a side of an aperture for receiving a roller at an angle to said first rollers, and a spacing bar adjacent and parallel to said reversely positioned section and defining the opposite side of said last aperture.

5. A roller separator comprising an arc-shaped sheet strip member having spaced apertures therein for receiving rollers, said member having spacing bars of substantially Z-shaped section defining the sides of said apertures, a roller in each of said apertures, the slanting portion of each spacing bar being positioned parallel to the axis of the roller received in the adjacent aperture and retained by said spacing bar, at least one of said spacing bars being positioned reversely with respect to another, and a button mounted on the outer slanting portion of at least one of said spacing bars for supporting said strip member.

6. A roller separator comprising an arc-shaped sheet strip member having spaced apertures therein for receiving rollers, said member having spacing bars of substantially Z-shaped section defining the sides of said apertures, the slanting portions of adjacent bars forming the sides of one aperture being substantially parallel, and the slanting portions of adjacent bars forming the sides of another aperture being substantially parallel but generally perpendicular to said first slanting portions.

EUGENE H. IRASEK.